(No Model.) 2 Sheets—Sheet 1.
J. STONE.
METHOD OF MAKING BUTTON HOLE STRIPS.
No. 415,424. Patented Nov. 19, 1889.
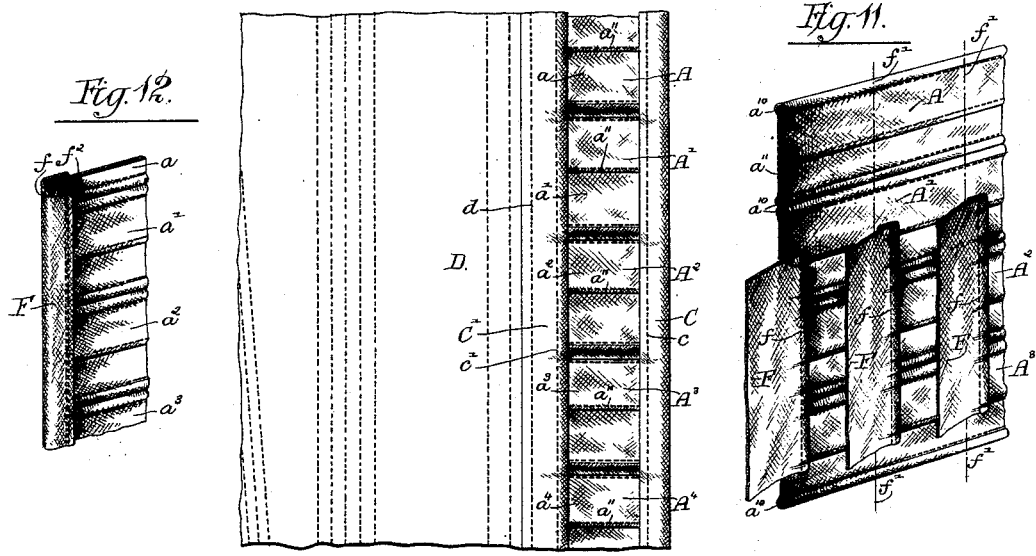
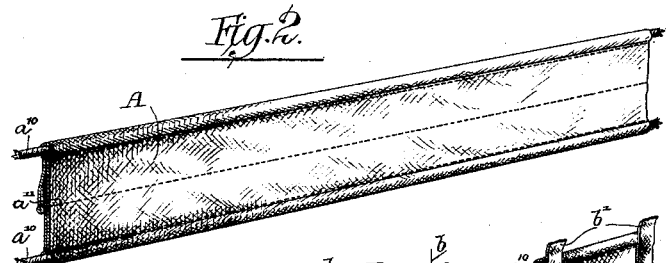
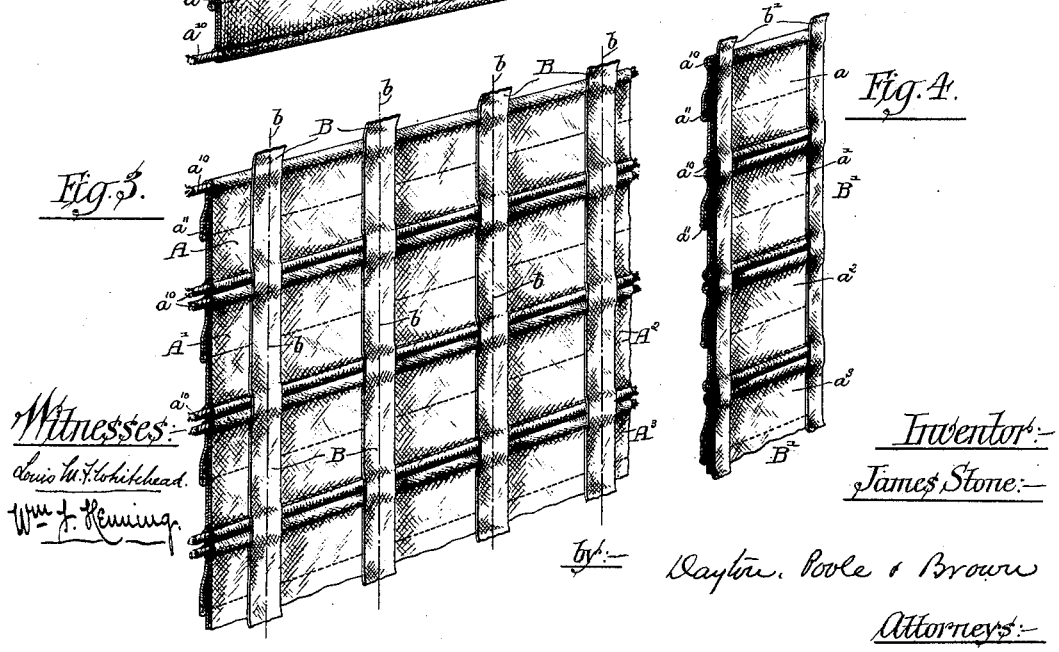
Witnesses:
Louis M. F. Whitehead
Wm. F. Henning
Inventor:
James Stone
by Dayton, Poole & Brown
Attorneys (No Model.) 2 Sheets—Sheet 2.
J. STONE.
METHOD OF MAKING BUTTON HOLE STRIPS.
No. 415,424. Patented Nov. 19, 1889.
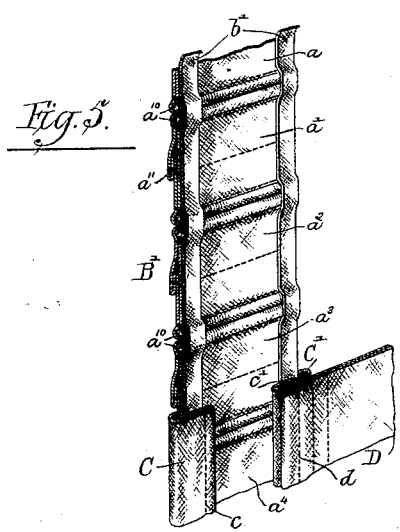
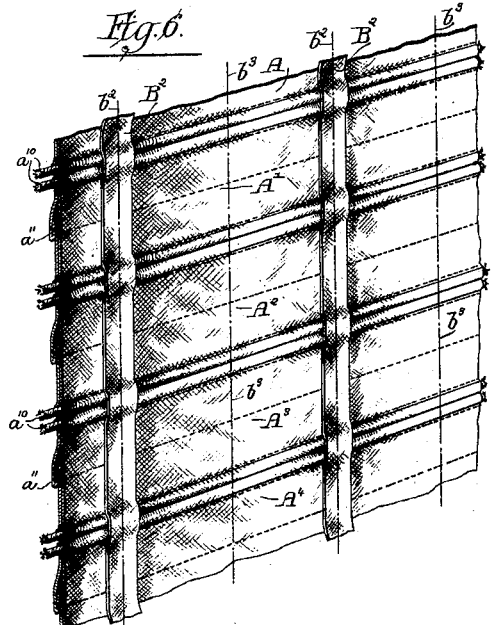
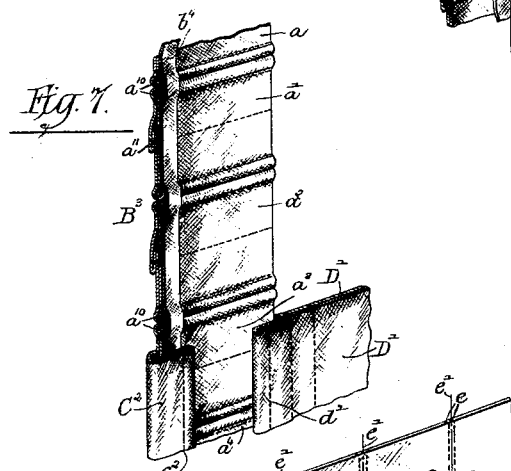
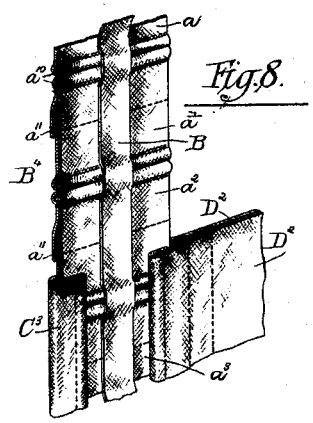
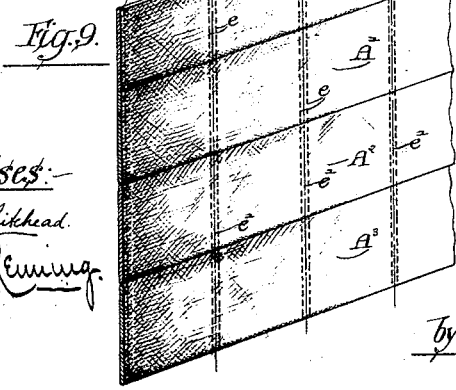
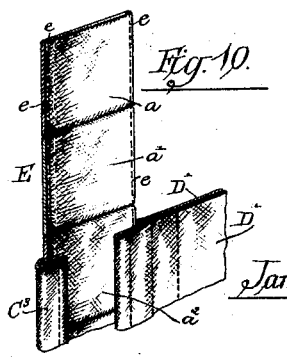
Witnesses:
Louis W. F. Whitehead.
Wm. T. Henning.
Inventor:
James Stone:—
by Dayton, Poole & Brown
Attorneys.

UNITED STATES PATENT OFFICE.

JAMES STONE, OF AURORA, ILLINOIS.

METHOD OF MAKING BUTTON-HOLE STRIPS.

SPECIFICATION forming part of Letters Patent No. 415,424, dated November 19, 1889.

Application filed March 15, 1889. Serial No. 303,423. (No model.)

*To all whom it may concern:*

Be it known that I, JAMES STONE, of Aurora, in the county of Kane and State of Illinois, have invented a certain new and useful Method of Making Button-Holes; and I do hereby declare that the following is a full, clear, and exact description thereof, reference being had to the accompanying drawings, and to the letters of reference marked thereon, which form a part of this specification.

This invention relates to an improvement in the method of making button-holes in garments—such as corsets and the like—its object being more especially to produce a button-hole strip adapted for attachment to the main part or body of the garment.

In a prior patent, No. 370,903, dated October 4, 1887, I have shown and described a novel method of making button-hole strips, which consists in joining by their edges a series of long strips by sewing or stitching the same together in such manner as to leave gaps or openings at regular intervals between the strips, and then severing the strips transversely between the gaps to form a series of incomplete button-hole strips, which are finished by means of binding applied to the edges of the strips. In the novel method constituting my present invention I secure said strips together edge to edge by the use of transverse strips or strands of paper, cloth, tape, or other suitable flexible material, pasted or otherwise secured to the several strips so as to hold the same together. The strips thus connected are severed transversely to form a plurality of separate incomplete button-hole strips, which, after being provided with suitable bindings at their edges, constitute the finished button-hole strips. Instead of using a strand or tape applied to the surface of the strips, however, the same may be joined by lines of stitching extending across the strips and connecting the same by the threads of the stitching, the said threads in such case forming the connecting transverse strands which hold the strips together in the same manner as the strands pasted or otherwise secured to the surface of the strips. The use of strips or strands applied transversely to the longitudinal strips has the advantage of securing said strips together much more easily and rapidly than by sewing the individual strips together along their edges, while the final result is practically the same.

My novel method may be more readily understood by reference to the accompanying drawings, in which—

Figure 1 is a side elevation of the margin of a garment—such as a corset—showing a button-hole strip constructed in accordance with my invention. Fig. 2 shows a perspective view of a strip with corded edges prepared in readiness for making button-hole strips. Fig. 3 shows in perspective view a series of the strips shown in Fig. 2 as connected together edge to edge by means of transverse connecting-strips pasted or glued to the same. Fig. 4 shows in perspective view an incomplete button-hole strip cut from the strip shown in Fig. 3 before the same is provided with a binding. Fig. 5 shows the button-hole strip with a binding attached. Fig. 6 shows in perspective a series of strips connected by transverse strands arranged in a somewhat different manner from those illustrated in Fig. 3. Fig. 7 shows the button-hole strip cut from the strip shown in Fig. 6, with the binding applied thereto. Fig. 8 shows a button-hole strip the pieces or sections of which are connected by an adherent strand intended for subsequent detachment. Fig. 9 shows a series of strips of webbing connected by transverse rows or lines of sewing-machine stitching. Fig. 10 shows a button-hole strip cut from the connected strips shown in Fig. 9. Fig. 11 shows a series of strips connected by means of the binding-strips. Fig. 12 illustrates a button-hole strip made by severing transversely the strips shown in Fig. 11.

As illustrated in Fig. 2, A is a strip formed from a piece of cloth the edges of which are folded over two cords $a$ $a$ and stitched together at the middle of the strip, as indicated at $a'$, so as to afford a strip of double thickness having corded edges and neatly finished on both sides.

As shown in Fig. 3, A A' A² A³ A⁴ indicate a series of strips made like that shown in Fig. 2, and secured together side by side, with their edges in contact, by means of transverse strips or strands B B B, arranged parallel with each other and secured to the strips A A' A²

$A^3$ $A^4$ by means of paste or glue. The strands B B B may, however, be secured to the strips A A' $A^2$, &c., by sewing, stitching, or other equivalent means. It is not essential, however, that said strands should be permanently secured to the strips, and pasting will therefore commonly be preferred as being the most simple and convenient way of securing the strands to the strips.

The strands B B B are placed at a distance apart equal to the width of the proposed button-hole strips. The sheet or web formed by the strips A A' $A^2$, secured together side by side by means of transverse strips or strands, in the manner described, is severed into a series of separate incomplete button-hole strips by means of cuts extending transversely through the several strips, such cuts desirably passing lengthwise through the strands B B B, as indicated by dotted lines $b$ $b$, Fig. 3. The incomplete button-hole strips formed by so severing the sheet or strips A A' $A^2$, as shown at B', Fig. 4, each consist of a series of short sections or pieces $a$ $a'$ $a^2$ $a^3$, which are held together by the strips or strands $b'$ formed by severing longitudinally the strands B B. The strip B' thus formed is provided at its outer edge, or that which forms the margin of the garment, with a binding-strip C, which is folded over the edge of the said strip B' so as to cover the holding-strand $b'$, and is secured to the sections $a$ $a'$ $a^2$ by a line of stitching $c$. It will of course be seen that in this method of making the button-hole strip the binding C forms the sole means of fastening or closing the outer ends of the spaces or gaps between the strips $a$ $a'$ $a^2$ to form the ends of the button-holes, the strands $b'$ serving solely as a means of holding together the cloth sections $a$ $a'$ $a^2$ until the permanent binding is applied.

The button-hole strip B' may be provided at its inner edge or that nearest the body of the garment with a binding C', folded over the edge of the strip and secured thereto by a line of stitching $c'$, and the complete button-hole strip may be then secured to the body of a garment—such as is shown at D, Figs. 1 and 5—by lines of stitching $d$ $d$. The inner edge of the button-hole strip may, however, be otherwise secured to the garment—as, for instance, the inner edge of the button-hole strip may be inserted and secured between the edges of the layers of the garment, as shown in Fig. 7, and hereinafter described.

In carrying out my novel method it is not essential that the transverse strips or strands which connect the short pieces or sections composing the button-hole strips should be located at both edges of the sections, and the same general result may be obtained in a construction where the strand applied for connecting the said pieces is located at one edge only of the same; or in case the connecting-strand is temporarily secured to the said sections—as when the parts are connected by pasting—said strand may be located along the middle line of the sections, and may be removed after the binding has been applied or the strip has been inserted in the garment.

The method of construction last above referred to is illustrated in Figs. 6 and 7. In Fig. 6 is shown a series of strips A A' $A^2$, which are secured together by transverse strands $B^2$ $B^2$, arranged at a distance apart equal to twice the width of the proposed button-hole strip. The sheet thus formed is severed by cutting along lines midway of the strips $B^2$, as indicated by the dotted lines $b^2$, and by cutting along other lines $b^3$ between said strands. The resulting incomplete button-hole strips each consist of a series of short pieces $a$ $a'$ $a^2$ $a^3$, connected by a single strand $b^4$, which is formed by severing longitudinally the strand $B^2$. The button-hole strip $B^3$, Fig. 7, thus formed may be provided with a binding, and secured in the garment in the same manner hereinbefore described. As illustrated in said Fig. 7, it is provided with a binding $C^2$, secured by stitching $c^2$ at one edge, and at its opposite edge is inserted between the layers D' D', forming the body of the garment, the edges of the layers being secured to the strip by the line of stitching $d'$ passing through the same, in the manner illustrated.

In Fig. 8, $B^4$ indicates an unfinished button-hole strip such as would be formed by severing the sheet shown in Fig. 3 by cutting through the strips A A' $A^2$ at points midway between the strands B B. The strip $B^4$ thus formed may be provided with a binding $C^3$ at one edge, and secured to the margin of the body $D^2$ of the garment at its opposite edge, in the same manner as before described. The strand B will in this case be only temporarily secured to the sections $a$ $a'$ $a^2$, so that said strand may be easily removed therefrom after the button-hole strip is provided with a binding or attached to the garment.

I have shown in Figs. 9 and 10 a way in which my invention may be carried out by the use of transverse lines of machine-stitching as a means of securing together the sections which are to form the button-hole strips. As shown in Fig. 9, A A' $A^2$ are strips consisting of tapes, webbing, or other material having finished edges on both sides. These strips are secured together by parallel transverse lines of sewing-machine stitching $e$ $e$ $e$ $e$. $e'$ $e'$ indicate lines along which the said strips A A' are severed to form the unfinished button-hole strips. The lines of stitching $e$ $e$ are so disposed as to provide a line of stitching on each side of each of the lines along which the strips are severed.

E, Fig. 10, indicates one of the button-hole strips formed by severing the connected strips shown in Fig. 9, the short sections $a$ $a'$ $a^2$ $a^3$ composing said strip E being united at both sides by the lines of stitching $e$ $e$. The strip E is shown as provided with a binding $C^3$, and as attached to a body D' of the garment, in the same manner as hereinbefore described.

In Figs. 11 and 12 I have shown still another method of making button-hole strips, wherein strips or tapes afterward used as a permanent binding are employed to connect the cloth strips before the latter are severed, in place of separate strands especially employed for the purpose. As shown in said Fig. 11, A A' A² indicate the cloth strips arranged side by side in the same manner as before described, and provided with corded or otherwise finished edges. F F F are tapes or binding-strips arranged transversely upon the strips A A' A² parallel with each other, each of said strips F F F being secured at one of its margins to the said strips A A' A² by a line of stitching $f$, the opposite or free end of said tapes F F F being left free or unsecured. After the sheet has been prepared by securing the strips or tapes F F F transversely to the strips A A' A² in the manner described, said strips A A' A² are severed transversely across the same close to the lines of stitching $f$ $f$, and along the lines indicated by the dotted lines $f'$ $f'$, thereby producing unfinished button-hole strips consisting of short sections $a$ $a'$ $a^2$, held together solely by the tapes or binding-strips F F. The free edge of the said strip F is then folded over or around the adjacent edge of the sections $a$ $a'$ $a^2$ and secured in place by a second line of stitching $f^2$, which may, if preferred, coincide with the first line of stitching $f$. After the button-hole strip is finished, as shown in Fig. 12, the same may be secured to the garment by sewing the free ends of the sections $a$ $a'$ $a^2$ between the layers of cloth composing the garment, in the manner illustrated in Figs. 7, 8, and 10, or otherwise.

It will be clear, from the above description of the several ways in which my invention may be carried out in detail, that as far as the main or essential feature of my novel method is concerned the transverse strands by which the strips are secured together may be either temporarily or permanently secured to the said strips, and may be either used solely for the purpose of connecting the said strips, or may consist of binding or other strips, which are afterward utilized in finishing the garment. It is obvious, furthermore, that said strips may consist of any suitable material, and may be corded at their edges in the manner shown, or otherwise constructed as found convenient or desirable. That method which includes the introduction of cords into the edges of the folding-strips is, however, for some reasons preferred, and is herein claimed as part of my invention.

I claim as my invention—

1. The herein-described method of making button-hole strips, consisting in joining edge to edge a series of flexible strips by a transversely-arranged fastening device, and then severing the strips by transverse cuts.

2. The herein-described method of making button-hole strips, consisting in joining edge to edge a series of strips by a transversely-arranged fastening device, then securing the strips by transverse cuts, and thereafter binding the edges of the severed strips, substantially as described.

3. The herein-described method of making button-hole strips, which consists in cording the edges of a series of strips, joining said strips edge to edge by transverse strands, and finally severing the strips transversely to form a series of button-hole strips.

In testimony that I claim the foregoing as my invention I affix my signature in presence of two witnesses.

JAMES STONE.

Witnesses:
C. CLARENCE POOLE,
GEO. W. HIGGINS, Jr.